July 3, 1962    R. J. CONVERY    3,042,709
ESTERIFICATION OF NAPHTHALENE DICARBOXYLIC ACIDS
Filed April 28, 1960
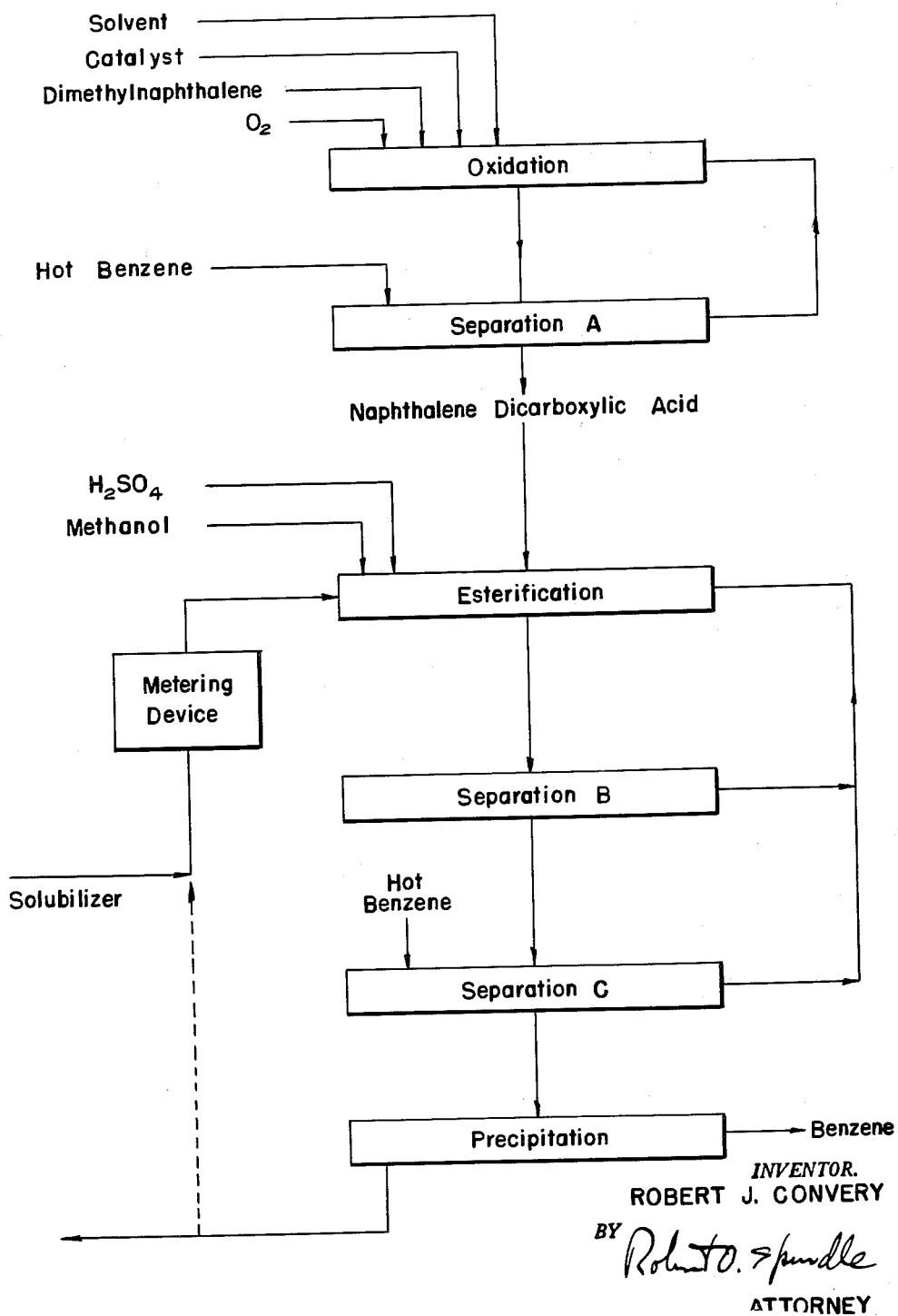
INVENTOR.
ROBERT J. CONVERY
BY
ATTORNEY

United States Patent Office 3,042,709
Patented July 3, 1962

3,042,709
ESTERIFICATION OF NAPHTHALENE
DICARBOXYLIC ACIDS
Robert J. Convery, Wilmington, Del., assignor to Sun Oil Company, Philadelphia, Pa., a corporation of New Jersey
Filed Apr. 28, 1960, Ser. No. 25,377
6 Claims. (Cl. 260—475)

This invention relates to a method for the preparation of esters of naphthalene dicarboxylic acids, particularly the 2,6 isomer. Other naphthalene dicarboxylic acids such as the 1:2, 1:3, 1:5, 1:7, 1:8, 2:7, 1:4, 1:6 and 2:3 isomers may be treated to form the corresponding diester derivatives. In a copending application, Serial No. 851,-229, filed November 6, 1959, there is described a process for the preparation of naphthalene dicarboxylic acids. Briefly, the process comprises contacting a dimethylnaphthalene isomer with oxygen and a cobalt salt at oxidation conditions to produce the corresponding naphthalene dicarboxylic acid. The diacid product is contaminated with from about 30 to about 60 weight percent mono-acid. The crude acid product is treated with benzene to separate a concentrated diacid product, the latter being insoluble in benzene. One embodiment of the process is specific to the production of 2,6 naphthalene dicarboxylic acid.

At the present time, there is an interest in the diesters of naphthalene dicarboxylic acids, particularly the 2,6 isomer for use in the making of polyester fibers. I have found that the diesters may be produced from the diacid in good yield.

Accordingly, it is the object of this invention to provide a process for the esterification of naphthalene dicarboxylic acids to form the desired naphthalene diesters in a straightforward manner with high yields.

Application of prior art techniques of esterification of acids with alcohols when applied to naphthalene dicarboxylic acids has been found to result in low yields of ester product. The examples set forth in the table, infra, show that conventional treatment with acid in methanol results in yields of less than 50% by weight based on the feed. Apparently the diacid feed will not dissolve in methanol or other lower alcohols in large amounts under moderate operating conditions.

I have found that when certain substituted naphthalenes are added to the reaction mixture, the yield of diester product increases very significantly. Specifically, compounds having the general formula

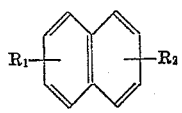

where $R_1$ is a carboxyl group, an aldehyde group or an ester group (i.e. carboalkoxy group) containing 2 to 4 carbon atoms and $R_2$ is a methyl group or an ester group containing 2 to 4 carbon atoms and mixtures thereof act as solubilizers for the naphthalene dicarboxylic acids and the presence in the reaction mixture of such substituted naphthalenes results in an increase in the desired diester product. $R_1$ and $R_2$ can be attached to the same ring or each to separate rings in the naphthalene group. When the diacid feed is the 2,6 isomer, examples of the solubilizer are, 2,6-dicarbomethoxynaphthalene, 6-carboxy-2 naphthaldehyde, 2-carbomethoxy-6-naphthoic acid and mixtures thereof. When the diacid feed is another position isomer, the corresponding solubilizers preferably are used. The substituted naphthalene is added in amounts of from about 50 to about 300% by weight based on the diacid.

The rate of esterification is dependent in part upon the ratio of methanol to diacid, the ratio of esterification catalyst to diacid, the amount of water in the mixture and the temperature.

Aliphatic alcohols having the type formula ROH where R is an alkyl group having 1 to 3 carbon atoms are suitable esterification agents. Thus, methanol, ethanol and propanol may be used and of these, methanol is preferred. For purpose of description, the alcohol is hereafter considered to be methanol.

The weight ratio of methanol to naphthalene diacid should be not less than 7.0 to 1 to obtain a reasonable amount of conversion. A rapid decrease in conversion occurs at lower values. A suitable operating range is 7.0 to 1 to 15.0 to 1. Higher ratios than 8.5 to 1 do not significantly increase conversion. The preferred operating range is 7.5 to 1 to 8.5 to 1.

The esterification reaction can be conducted by means of any of the known esterification catalysts. Inorganic acids are the usual choice. When sulfuric acid is used as the esterification catalyst, the weight ratio of sulfuric acid to diacid should not be less than 1:10. Below this limit there is a rapid decline in the amount of diacid converted. Ratios above this value cause very little variance in the percent conversion of the diacid. When other esterification catalysts such as $H_3PO_4$, $BF_3$, HF and HCl are used, suitable weight ratios can readily be established for effectively promoting the esterification.

The reaction rate is also quite dependent on the initial concentration of the esterification catalyst added to the reaction mixture. For example, when 60% sulfuric acid was added, only 9% of the diacid was converted; but with 80% sulfuric acid the conversion was 60% in the same length of time. It is believed that water adversely affects the solubility of the naphthalene diacid in the methanol, thus hindering esterification. The acid should contain from 75 to 85% $H_2SO_4$. When the acid concentration is above 85%, the reaction begins to produce dimethyl ether which consumes methanol and raises the pressure in the reactor due to the higher vapor pressure of dimethyl ether as compared to methanol.

The reaction may be conducted at temperatures in the range of from about 110 to 220° C. A range of 130 to 160° C. is preferred. The controlling factor in pressure manipulation is the vapor pressure of the alcohol. Pressures of 50 to 550 p.s.i.g. are built up during the reaction with no adverse effect.

In order that those skilled in the art may more fully comprehend the nature of the invention and the manner of carrying it out, the following examples are given in tabular form. In each example, the reaction mixture was placed in a closed vessel equipped with an agitator. Other conditions accompany the data. The solubilizer may be from an independent source or may be taken from a product stream or recycle stream of the process.

TABLE

*Esterification of 2,6 Naphthalene Dicarboxylic Acid*

| Run No. | Solubilizer | Moles—$H_2SO_4$, Moles—Diacid | Moles—Methanol Moles—Diacid | Time (Min.) | Temp. (°C.) | Acid No. | Percent Diacid | Percent Diacid Converted |
|---|---|---|---|---|---|---|---|---|
| 1 | None | 0.22 | 54.0 | 60 | 110 | 448 | 82 | 8 |
| 2 | do | 0.22 | 68.2 | 60 | 120 | 381 | 72 | 28 |
| 3 | do | 0.22 | 54.0 | 100 | 131 | 402 | 77 | 33 |
| 4 | do | 0.07 | 54.0 | 60 | 120 | | 28.5 | 23 |
| 5 | do | 0.44 | 68.2 | 60 | 120 | 248 | 48 | 54 |
| 6 | do | 0.88 | 68.2 | 60 | 120 | 193 | 38 | 64 |
| 7 | do | 0.29 | 54.0 | 100 | 120 | 222 | 43 | 57 |
| 8 | do | 0.66 | 162.0 | 100 | 120 | 254 | 48 | 52 |
| 9 | do | 0.22 | 202.0 | 60 | 120 | 279 | 54 | 57 |
| 10 | 2.0 gm. naphthalene dimethylester. | 0.44 | 162.0 | 60 | 120 | | 7.1 | 80 |
| 11 | 1.5 gm. of a mixture of naphthalene monoester and naphthalene ester aldehyde. | 0.44 | 108.0 | 60 | 120 | | | 80 |

By comparing Runs 2 and 6 of the table, it can be seen that an increase in the mol ratio of esterification catalyst with other conditions remaining constant results in an increase of 26% of the diacid converted in the absence of a solubilizer. Runs 10 and 11 show that the addition of a substituted naphthalene solubilizer results in the conversion of 80% of the naphthalene diacid.

Referring to the schematic flowsheet, oxidized dimethylnaphthalene is contacted with hot benzene in separation zone A. The diacid portion of the oxidation product is insoluble in benzene. The other materials may be recycled to the oxidation step after separation of the benzene. The feed to the esterification step consists of a material rich in naphthalene dicarboxylic acid. It is not necessary that the feed be pure. Sulfuric acid, methanol and substituted nauhthalene solubilizer are added and the reaction mixture is heated to about 130° C. Pressure is allowed to build up to 200 p.s.i.g. or more. After a period of 10 to 90 minutes, the reaction is stopped and the products are passed to separation zone B. The separation may carried out by cooling the mixture and filtering solid material from the liquid. Liquid material may be recycled to the esterification step. The separated solid which is composed mainly of diacid and diester, is passed to separation zone C where it is contacted with hot benzene which preferentially dissolves the desired diester product. The diacid, after evaporation of any benzene entrained therein, may be returned to the esterification step. The hot benzene solution is passed to a zone where it is cooled to precipitate the diester. The latter may be returned to the esterification step in controlled amounts for use as a solubilizer. The material balance of the esterification is maintained by means of bleed streams, recycle streams and make-up streams. Anhydrous acid make-up can be used to keep the concentration of water in the system low.

I claim:

1. The process of contacting 2,6-naphthalene dicarboxylic acid under esterification conditions with an esterification catalyst and an alcohol having the formula ROH in which R is an alkyl group having 1 to 3 carbon atoms, in the further presence of a solubilizer comprising a substituted naphthalene having the formula

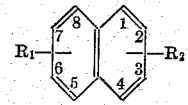

where $R_1$ is selected from the group consisting of a carboxyl group, an aldehyde group and an ester group containing 2 to 4 carbon atoms and $R_2$ is selected from the group consisting of a methyl group and an ester group containing 2 to 4 carbon atoms and recovering as a product diester corresponding to the naphthalene dicarboxylic acid feed.

2. The process according to claim 1 in which the alcohol is methanol and the acid is $H_2SO_4$ having a concentration of 75 to 85%.

3. The process according to claim 2 in which the solubilizer is 2,6-dicarbomethoxynaphthalene.

4. The process according to claim 2 in which the solubilizer is a mixture of 2-carbomethoxy-6-naphthoic acid and 6-carboxy-2-naphthaldehyde.

5. The process of contacting 2,6-naphthalene dicarboxylic acid at a temperature in the range of from 130–160° C. and superatmospheric pressure with $H_2SO_4$ having a concentration of 75 to 85% and methanol in the further presence of a solubilizer comprising 2,6-dicarbomethoxynaphthalene and recovering 2,6-dicarbomethoxynaphthalene as a product of the process.

6. The process of containing 2,6-naphthalene dicarboxylic acid at a temperature in the range of from 130–160° C. and superatmospheric pressure with $H_2SO_4$ having a concentration of 75 to 85% and methanol in the further presence of a solubilizer comprising a mixture of 2-carbomethoxy-6-naphthoic acid and 6-carboxy-2-naphthaldehyde and recovering 2,6-dicarbomethoxynaphthalene as a product of the process.

References Cited in the file of this patent

Meier et al.: Chemische Berichte, vol. 90, pages 222–8 (1957).